United States Patent [19]

Anthony et al.

[11] E Re. 30,065

[45] Reissued Aug. 7, 1979

[54] NUCLEAR REACTOR

[75] Inventors: Andrew J. Anthony, Tariffville; Edward A. Gruber, Windsor Locks, both of Conn.

[73] Assignee: Combustion Engineering, Inc., Windsor, Conn.

[21] Appl. No.: 865,000

[22] Filed: Dec. 27, 1977

Related U.S. Patent Documents

Reissue of:

[64] Patent No.: 3,366,546
Issued: Jan. 30, 1968
Appl. No.: 511,138
Filed: Dec. 2, 1965

[51] Int. Cl.[2] ..... G21C 3/30
[52] U.S. Cl. ..... 176/76; 176/78
[58] Field of Search ..... 176/68, 74, 76, 78

[56] References Cited

U.S. PATENT DOCUMENTS

| | | | |
|---|---|---|---|
| 3,128,235 | 4/1964 | Hackney et al. | 176/78 X |
| 3,179,571 | 4/1965 | Schabert et al. | 176/68 |
| 3,185,632 | 5/1965 | Bradley | 176/78 X |
| 3,205,144 | 9/1965 | Jabsen | 176/78 X |
| 3,214,343 | 10/1965 | Natland | 176/74 X |
| 3,235,463 | 2/1966 | Sankovitch | 176/78 X |
| 3,238,108 | 3/1966 | Deddens et al. | 176/78 X |

FOREIGN PATENT DOCUMENTS 822790 1/1959 United Kingdom .

*Primary Examiner*—Peter A. Nelson
*Attorney, Agent, or Firm*—Richard H. Berneike

[57] ABSTRACT

*A nuclear reactor with control rods in channels between fuel assemblies wherein the fuel assemblies incorporate guide rods which protrude outwardly into the control rod channels to prevent the control rods from engaging the fuel elements. The guide rods also extend back into the fuel assembly such that they are relatively rigid members. The guide rods are tied to the fuel assembly end or support plates and serve as structural members which are supported independently of the fuel element. Fuel element spacing and support means may be attached to the guide rods.*

9 Claims, 15 Drawing Figures

NUCLEAR REACTOR

Matter enclosed in heavy brackets [ ] appears in the original patent but forms no part of this reissue specification; matter printed in italics indicates the additions made by reissue.

The present invention relates to nuclear reactors and more particularly to a reactor core design incorporating novel fuel element assemblies. The invention more specifically relates to means for both supporting the fuel element assemblies and providing guide means for control rods whereby control rod followers may be eliminated.

It is well known that the fuel or fisionable material for heterogeneous nuclear reactors is frequently contained in a number of thin tubes comprising fuel elements or rods which are grouped and joined together in the reactor in fuel element assemblies or bundles. Each reactor has a number of such fuel assemblies therein comprising the reactor core. It is also well known that reactors normally have one or more control rods which serve to regulate the reactivity of the reactor. These rods, which are composed of a neutron absorbing material, extend down into the reactor core among the fuel assemblies to absorb neutrons and reduce the reactivity. These control rods fit into channels between the spaced fuel element assemblies.

Prior art control rods are relatively large in cross sectional area so as to be of sufficient rigidity. This is necessary to prevent the control rods from flexing within the control rod channels and either jamming or damaging the adjacent fuel elements. The large cross sectional area of the control rods requires that the control rod channels be of a comparable large size to accommodate the rods. When the reactor is operating and the control rods are withdrawn from the core, the control rod channels become filled with the reactor coolant, which would be water in the case of a water cooler-water moderated reactor. This concentration of water which is large compared to the amount of water between the fuel elements within the fuel assemblies causes a neutron flux peak in the region of the control rod channels. This is due to the large concentration of moderator in this region together with the low neutron capture cross section of the water. This flux peaking causes undesirably high temperatures in the adjacent fuel elements. One common prior art method of eliminating this problem is to employ control rod followers which are attached to the free ends of the control rods and which occupy the control rod channels when the control rods are withdrawn. These followers, which are of a relatively non-absorbing material such as Zircaloy, therefore displace the water from the channels and eliminate the flux peaking. The followers may also be of such a length so as to be constantly in engagement with a guide means so that there will be support for the control rods and followers at all times from both ends.

The use of control rod followers, however, presents many problems. The follower itself, of course, involves some considerable expense. The attachment of the follower to the control rod means that the control rod-control rod follower assembly is on the order of twice as long as the control rod without the follower. The means that the reactor pressure vessel must be considerably longer or higher in order to accommodate the control rod followers in a position exterior of the core.

This large vessel, of course, involves considerable expense. The larger pressure vessel also normally means that the vessel will contain more water which, in turn, means that the containment system for the reactor must be larger in order to confine the pressure resulting from the energy release of the increased amount of water in the event of an incident. The longer control rod and follower combination also means that there is additional weight and, therefore, additional problems and expense involved in the mechanisms for controlling the rods. One of the major problems in the use of control rod followers is the connection between the follower and the control rod. These two sections must, of course, be of different materials since they must have vastly different neutron absorbing properties. Since the connection between the rod and the follower travels through the control rod channel it cannot be a bulky type of connection which would require that the control rod channel be increased in area. With prior art attaching means the dimensional accuracy which can be readily maintained on the connection between the rod and the follower is less than the accuracy attainable on the control rod itself thus requiring that the channel be enlarged slightly to allow for the maximum possible size of the joint. The enlarged channel, of course, means increased flux peaking.

The present invention therefore proposes the elimination of the control rod followers with a simultaneous reduction in the cross sectional area of the control rods and the control rod channels. It would, of course, be desirable to reduce the size of the control rod channels such that the fuel elements on either side of the channel are not substantially farther apart than the fuel elements within each of the fuel element assemblies. Such a spacing would virtually eliminate local flux peaking. The provision of control rod channels of such a size or of a size even approaching this presents several problems the solution of which the invention is directed. Reactor control must be available for starting the reactor, for bringing the power output to the desired level, to maintain it at that level, and then to shut down the reactor when necessary. Safety control must also be available to prevent damage in case of an accident. It is obviously quite essential that the control rods be constantly free to move in and out of the core without any possibility of sticking or jamming in the control rod channels. It is also quite essential that contact between the control rods and the fuel elements be prevented since such contact might eventually cause the rupture of the fuel elements and the resultant contamination with radioactive material. Since the cross sectional area of the control rods of the present invention has been reduced as discussed above, the rods no longer have the rigidity necessary to avoid such contact in control rod channels of the desired small size. Therefore, to maintain the channels small, there must be provision to avoid both jamming of the control rods and damage to the fuel elements.

The solution to the above problem also brought about the solution to another problem involved in the construction of fuel element assemblies. The fuel elements in these assemblies are conventionally rather long, thin tubes arranged in a spaced array. Since the elements are of relatively great length as compared not only to their individual diameters but also as to the lateral dimension of the fuel assembly it has become the practice to provide lateral spacing and support means along the length of the fuel assembly at selected locations. These spacing and support means prevent any bowing of the fuel elements and maintain the elements in parallel alignment as is necessary for proper reactor operation. The fuel elements within a single fuel assembly frequently undergo unequal thermal expansion which must be freely permitted to avoid excessive stresses in the fuel elements. It is therefore necessary that the spacing and support means permit the fuel elements to slide relative thereto while at the same time maintaining the elements in lateral alignment. For this reason the spacing and support means cannot be affixed directly to any of the fuel elements. It is necessary, however, that the spacing and support means be maintained in the proper position along the length of the fuel assemblies. Means other than the fuel elements themselves must be provided for this purpose.

The present invention accordingly has for an object the provision of a reactor core arrangement employing thin control rods and control rod channels thereby eliminating the necessity for rod followers.

The invention also has for an object the provision of novel and effective guide means for reactor control rods.

Another object of the invention is the provision of supporting means for the various components of a nuclear reactor fuel element assembly.

A further object of the invention is the provision of novel support means for fuel element assemblies which also serve as guide means for control rods.

Another object of the invention is the provision of a novel fuel element assembly construction which will provide guide means for control rods and which can be readily fabricated with a minimum of components.

A further object of the invention is the provision of control rod guide means which will not substantially increase the size of the control rod channel.

These and other features, advantages and objects of the present invention will be explained more fully in, and will be apparent from, the following description of the invention when read in conjunction with the accompanying drawings wherein.

Figure 13:
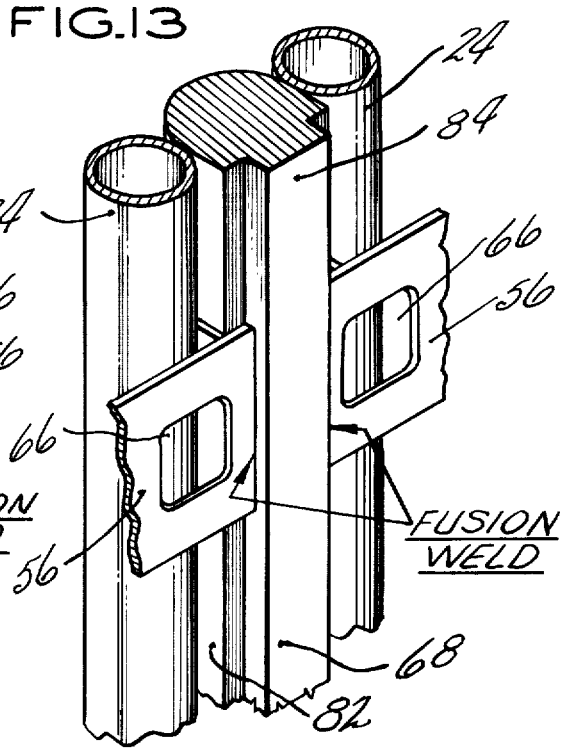
Figure 10:
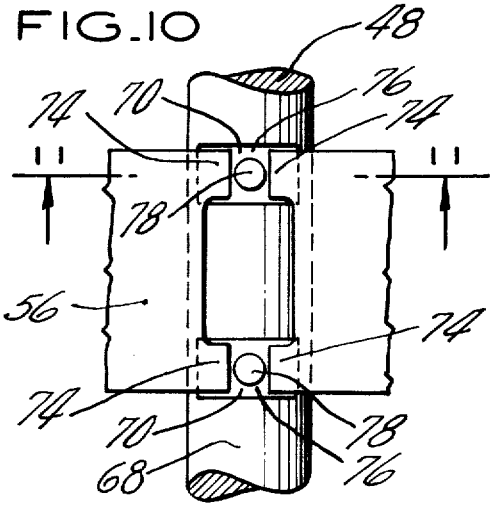
Figure 14:
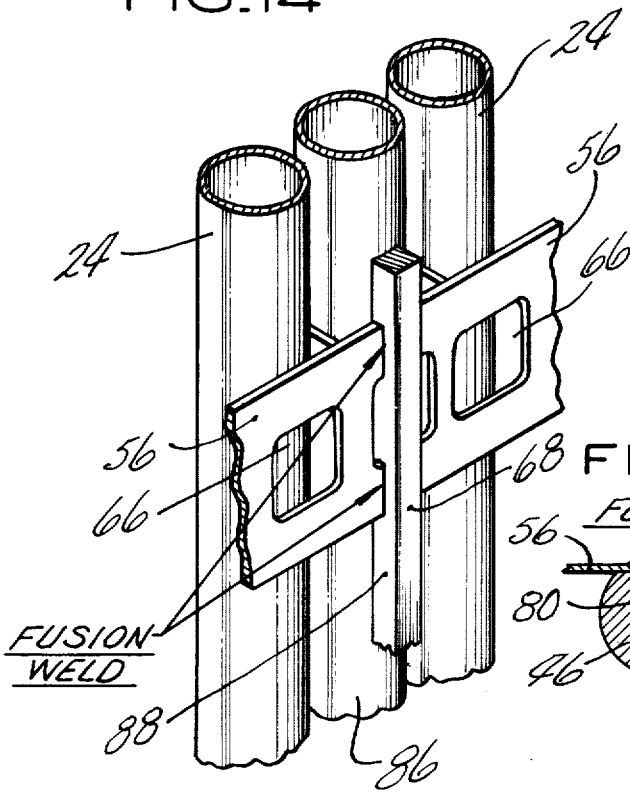
Figure 12:
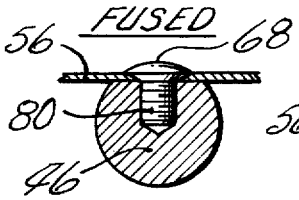
Figure 11:
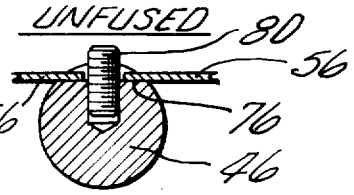

FIGS. 10, 11, and 12 illustrate various stages of a procedure for connecting the spacing and support means to the guide rod;

FIGS. 13 and 14 illustrate alternative control rod guide means; and

Figure 15:
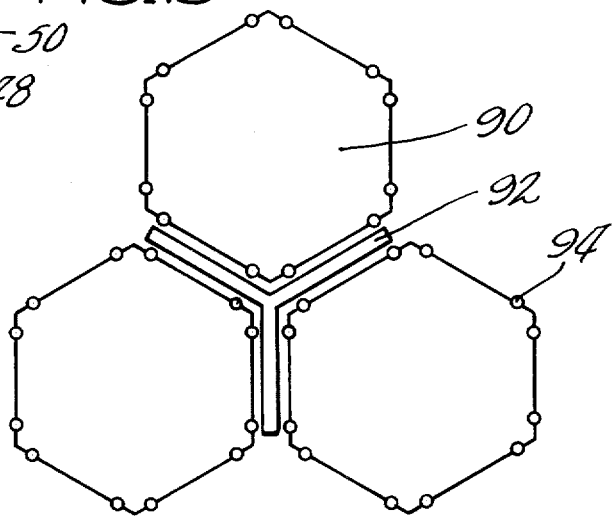

FIG. 15 illustrates the invention when applied to hexagonal fuel assemblies.

Figure 1:
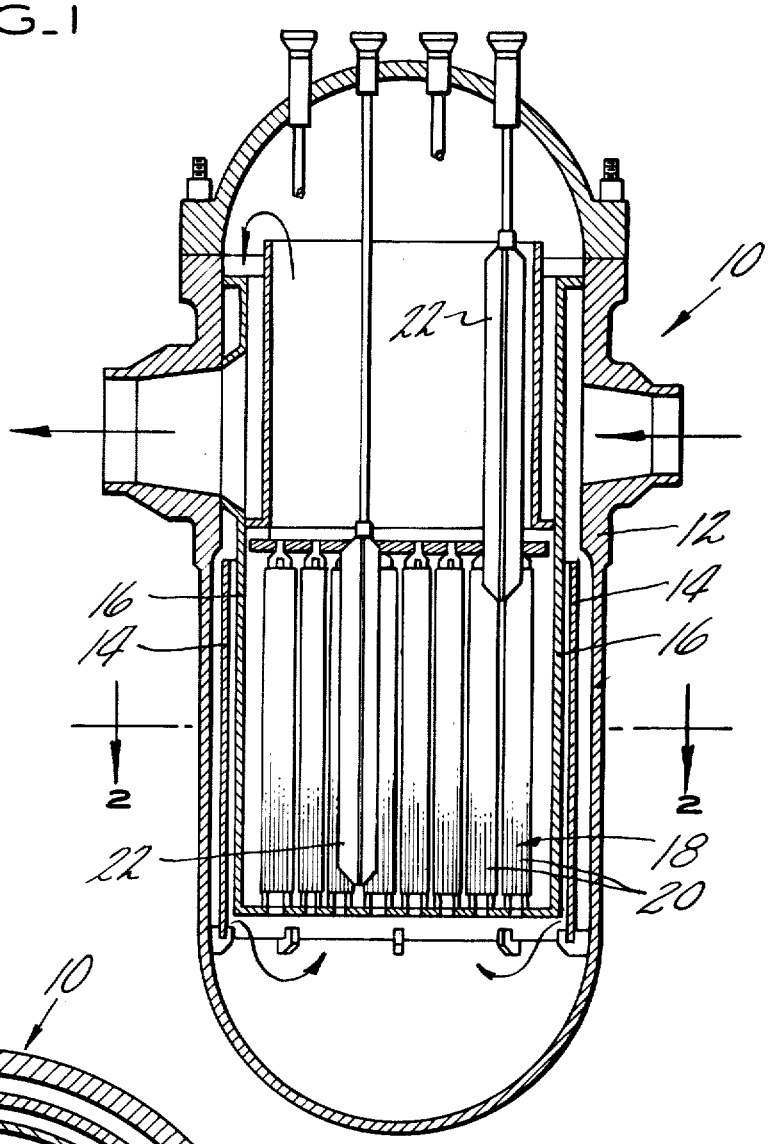
FIG. 1 is a vertical section view of a nuclear reactor suitable for use with the present invention.
Figure 2:
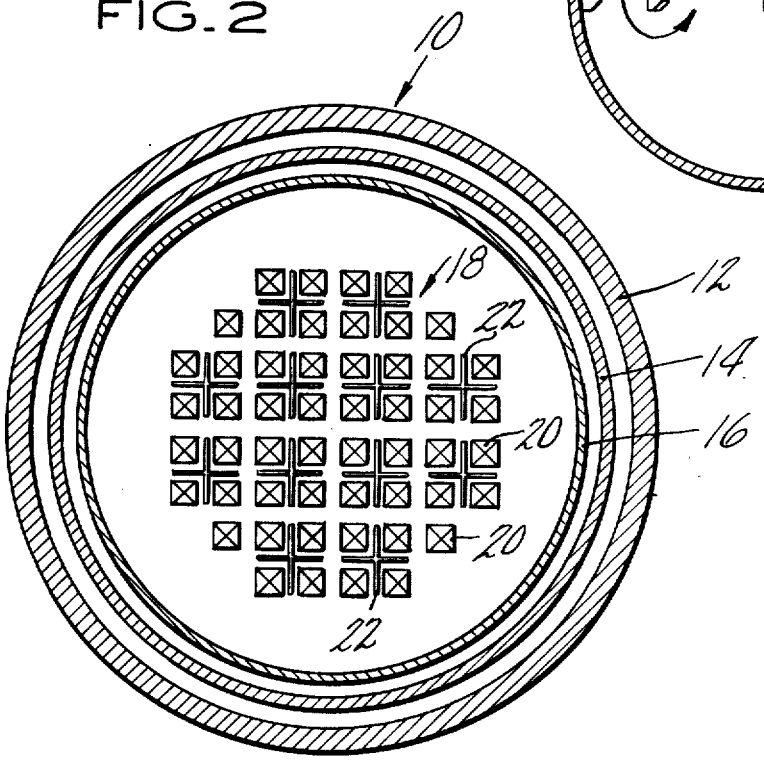
FIG. 2 is a horizontal cross section view of the reactor taken along line 2—2 of FIG. 1.

The reactor 10 shown in FIGS. 1 and 2 comprises a pressure vessel 12, a thermal shield 14 and a core support barrel 16 surrounding and containing a reactor core 18. This core is composed of a plurality of fuel assemblies 20 disposed in mutually perpendicular spaced rows. Interposed in the spaces between certain of the fuel assemblies are control rods 22 which are of conventional cruciform configuration. The general arrangement of the reactor components is depicted in FIG. 1 wherein only two of the control rods have been illustrated for purposes of clarity. The construction of the overall reactor and the manner in which the fuel assemblies and control rods are mounted in the reactor form no part of the present invention, however, and may be of any one of the many conventional designs which are well-known in the art requiring no detailed description.

Figure 3:
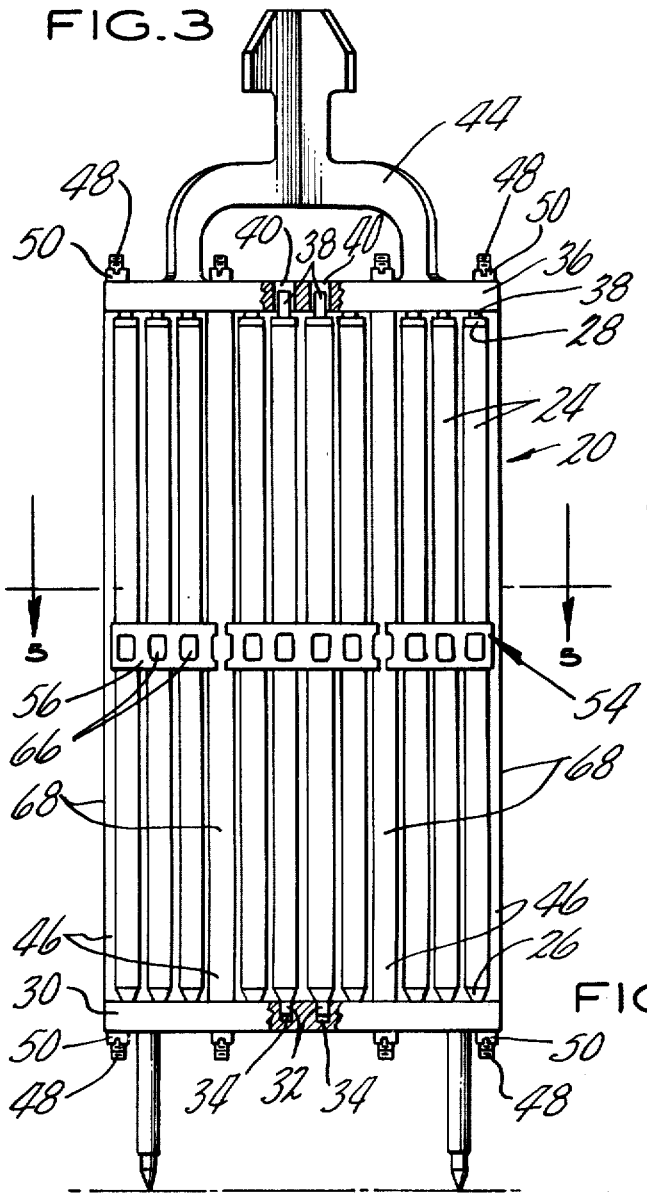
FIG. 3 is an elevation view of a fuel assembly.
Figure 4:
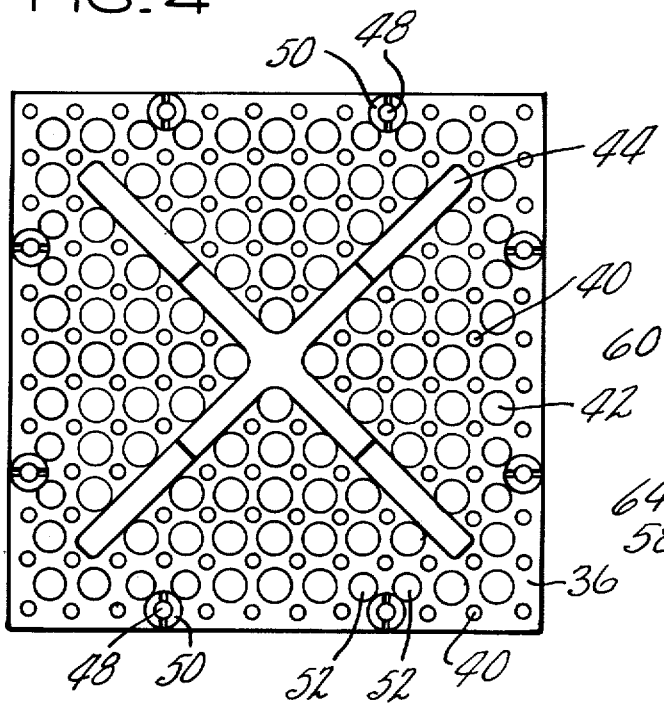
FIG. 4 is a plan view of the fuel assembly of FIG. 3.

The fuel assemblies 20 each comprise a plurality of fuel elements 24 as shown in FIG. 3. These fuel elements may be formed of tubes of stainless steel or other materials such as Zircaloy partially filled with pellets, discs, compacts, or powders of fissionable material. The tubes are capped at the bottom and top ends, respectively, by caps 26 and 28. The caps 26 at the lower end are rigidly affixed to a bottom support plate 30 such as by a force fit between pins 32 on the end caps 26 and blind poles 34 in the support plate 30. The upper ends of the fuel elements are held in position by a top support plate 36, the plan view of which is shown in FIG. 4. Pins 38 on the upper end caps 28 slidably fit into the holes 40 in the top suport plate. This slidable engagement between the fuel elements and the top support plate permits differential thermal expansion between the various fuel elements due to unequal heating.

FIG. 4 also illustrates a plurality of holes 42 interspersed between the holes 40. Similar holes also are formed in the bottom support plate 30 for the purpose of permitting the cooling fluid to flow upwardly through the bottom support plate, upwardly between the fuel elements of the fuel assembly and then out through the holes 42 in the top support plate. Also affixed to the top support plate 36 is a cruciform projection 44 which is for the purpose of handling the fuel assemblies and maintaining them in the correct position in the reactor core.

Since the fuel elements are not rigidly fastened to the top support plate it is necessary to provide means for holding this support plate in position. For this purpose a number of rods 46 are employed. These rods have threaded end projections 48 which project through appropriately positioned holes in the top and bottom support plates. Nuts 50 are then threaded on the projections 48 and preferably welded in place to prevent loosening during operation. Rods 46 together with the nuts 50 will then hold the fuel assemblies together as a unit. These rods 46 also serve other functions which will be pointed out hereinafter. It can be seen in FIG. 4 that the fluid flow holes 52 which are adjacent the nuts 50 are smaller than the fluid holes 42 so as not to unduly weaken the support plates at this point and interfere with the nuts 50.

The fuel elements 24 are of relatively great length as compared not only to their individual diameters but also as to the lateral dimensions of the fuel assembly which renders them susceptible to bending or bowing as previously pointed out. Such misalignment means that the fuel elements are closer together in certain portions of the assembly and that the area of the liquid flow path is altered in the same area. This will cause flux peaking in the liquid channels adjacent the bowed elements as well as unequal distribution of coolant flow which will result in overheating of the fuel elements in that portion of the assembly. The bowing of peripherally located fuel elements can also jam or obstruct control rod movement. It is therefore necessary to provide lateral spacing and support means along the length of the fuel assembly to maintain the fuel elements in parallel alignment.

Figure 5:
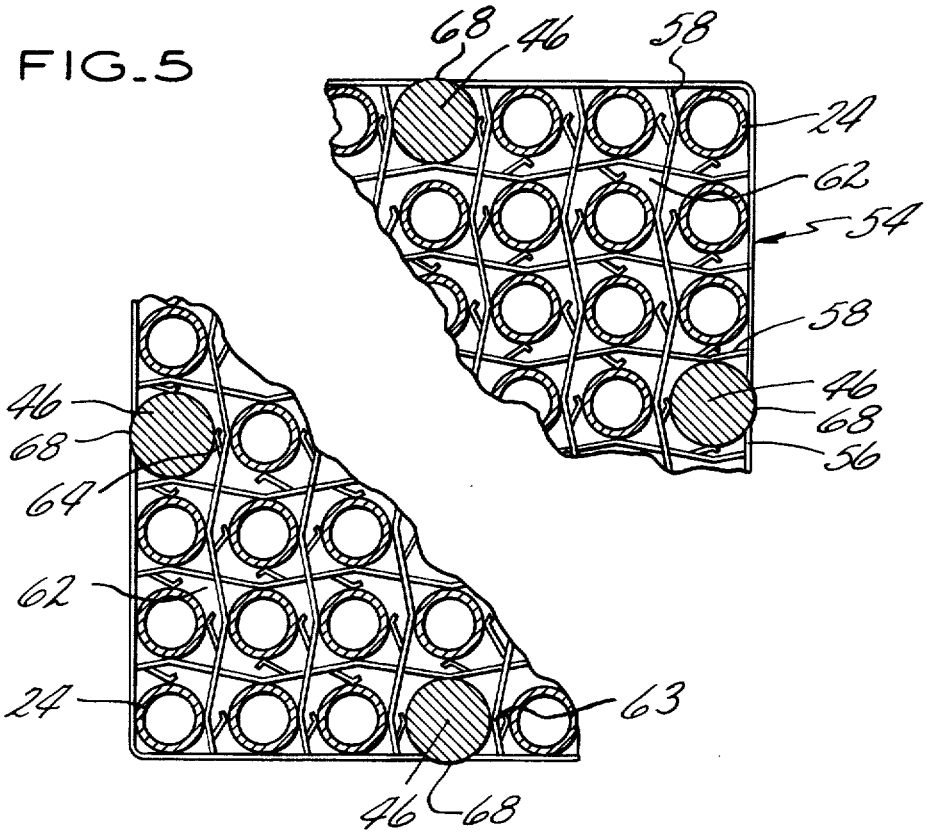
FIG. 5 is a partial cross section view of a fuel assembly taken along line 5—5 of FIG. 3.
Figure 6:
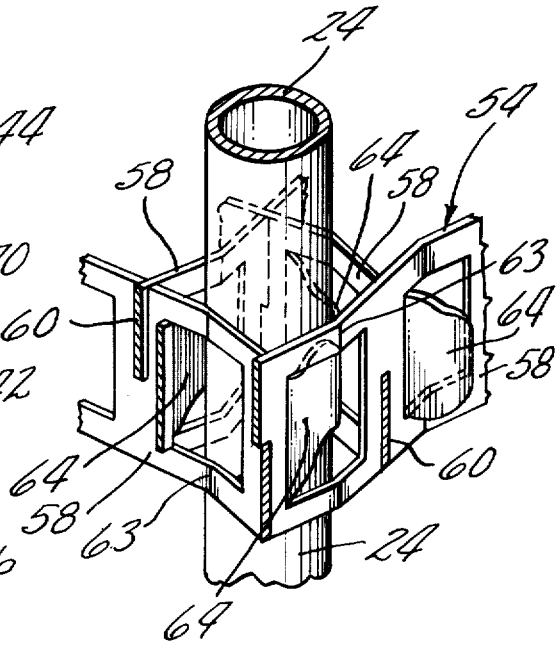
FIG. 6 is an isometric view of a portion of a fuel element and the associated spacing and supporting means.
Figure 9:
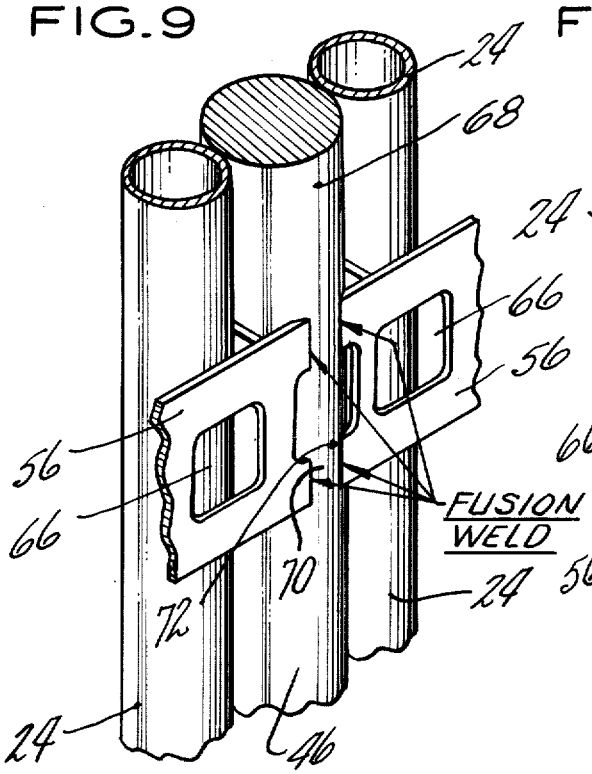
FIG. 9 is an isometric illustration of the guide rod of the present invention together with the adjacent fuel rods and a portion of the spacing and support means.

A spacing and support means 54 is illustrated in FIGS. 3, 5 and 6. The spacing and support means comprises a frame 56 around the periphery of the assembly encircling the array of fuel elements. Within the boundaries of the frame 56 are a plurality of members 58 which form a gridlike structure. These grid-forming components or members 58 are formed from thin elongated strips or bands of metal as is the frame 56. The grid-forming members 58 have slots 60 therein at the intersections of the members which permit the members to be interlocked together as shown in FIG. 6. This "egg-crate" like structure provides a plurality of compartments 62 through which the fuel elements 24 extend.

Each of the grid-forming members 58 is bent at points 63 generally corresponding to the mid-points of the compartments 62. Each bend will, therefore, extend outwardly from one compartment and into the adjacent compartment to form fuel element engaging arches therein. Formed from the grid-forming members 58 are spring tabs 64 which extend into the compartments 62 from two adjacent sides. These spring tabs engage the fuel elements and force them against the opposing arches.

The perimeter frame 56 is punched out as at 66 in FIGS. 3, 9, 13 and 14 at locations corresponding to the engagement of the frame with the fuel elements. These cut-outs permit local cooling of the fuel element cladding which touches the frame.

Since the spacing and support means 54 is not affixed directly to the fuel elements, but is slideable relative thereto, it is necessary to provide means for maintaining the support means 54 in position. This can be accomplished by attaching the support means 54 to the rods 46 such as by welding. The specific manner in which this attachment is preferably accomplished will be discussed hereinafter. The rods 46 are, therefore, serving not only to tie the entire fuel assembly together but also to maintain the spacing and support means in its proper position along the length of the assembly. It is obvious that there may be a plurality of spacing and support means 54 along the length of each of the fuel assemblies to provide the required bracing.

Figure 7:
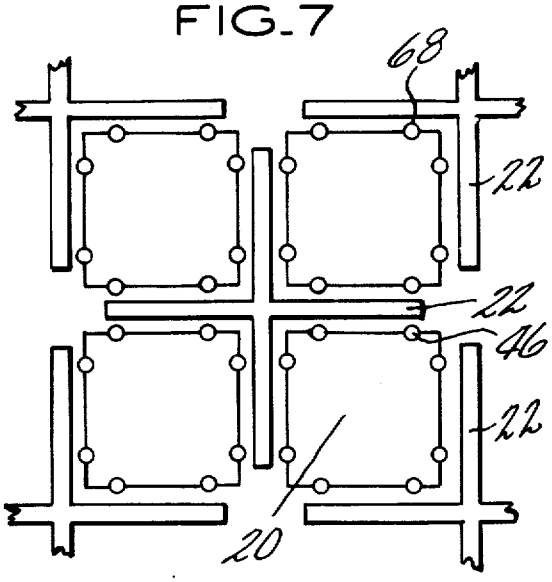
FIG. 7 is a schematic illustration of an arrangement of fuel assemblies and control rods embodying the present invention.
Figure 8:
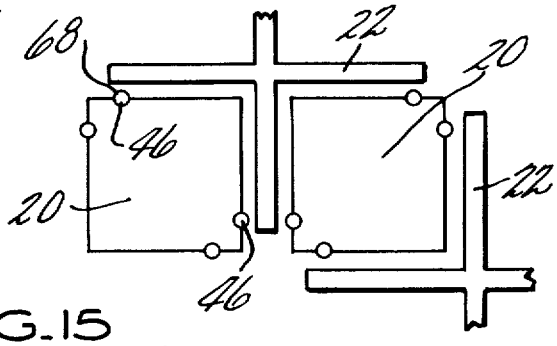
FIG. 8 is a schematic illustration similar to FIG. 7 incorporating a modified fuel assembly.

The relationship of the control rods to the fuel elements is shown in FIGS. 7 and 8 as well as in FIG. 2. The FIG. 2 arrangement illustrates groups of four fuel assemblies surrounded by portions of four control rods while the FIGS. 7 and 8 arrangement has each fuel assembly surrounded by portions of two control rods. Many different arrangements are possible for which the invention is equally applicable. It can be seen from these illustrations that if a control rod were to rotate as a unit only slightly or to shift laterally in the control rod channel, the control rod would contact the fuel assemblies. Since the control rods are thin and flexible, it is also possible for the individual blades of the cruciform control rods to flex relative to each other and contact the assemblies. The presence of the spacing and support means 54 and in particular the presence of the encircling frame 56 which protrudes outwardly from the exterior fuel elements presents a control rod jamming problem. The ends of the control rods could engage the top of the frame 56 upon insertion of the rod and thus cause the rod to jam. This, of course, could be disastrous.

The prevention of contact between the control rods and the fuel elements themselves as well as the prevention of jamming is accomplished by the use of guide surfaces 68. These guide surfaces are formed by and comprise the exterior surfaces of guide means which are a part of the fuel element assemblies. These guide means may take various forms and several modifications will be described. There are, however, several basic necessary or desirable features of the guide surfaces and guide means which are common to the various modifications. First of all, the guide surfaces should extend the full length of the fuel assemblies or at least substantially the full length so as to protect the fuel elements throughout the full excursion of the control rods. It is also essential that the guide means be relatively rigid so that they will remain straight and in position under operating conditions. This requires that the dimension of the guide means in a direction perpendicular to the sides of the fuel assemblies be substantial so as to prevent the guide means from flexing in this plane. At the same time it is essential that the guide means protrude outwardly from the sides of the fuel assemblies only a very small distance so as to keep the control rod channels small. These two latter requirements are counter to each other and the solution requires that the guide means extend some distance back into the interior of the fuel assemblies to provide the necessary rigidity. This, however, presents other design problems since the guide means cannot interfere with the fuel elements such as by causing hot spots.

The guide means illustrated in FIGS. 3, 5, 9 and 10–12 comprise the previously described rods 46 which already serve to tie the fuel assemblies together and to hold the spacing and support means 54 in position. The guide surfaces 68 comprise the protruding outer surfaces of the rods 46 which are larger in diameter than the associated fuel elements as most clearly shown in FIG. 5. Longitudinally extending segments of the rods 46 and therefore the guide surfaces 68 protrude through cut-out portions in the frame 56. These rods 46 provide all the desirable features mentioned above for the guide means, i.e., (1) they extend the full length of the fuel assemblies, (2) they extend outwardly from the sides of the fuel assemblies only a very small distance, (3) they are rigid since they extend back into the interior of the fuel assemblies. FIGS. 5 and 7 illustrate the use of eight guide rods per fuel assembly while the fuel assembly of FIG. 8 employs only four guide rods. There may, of course, be any number of guide rods in each fuel assembly so long as the necessary control rod support and fuel assembly support are provided. The advantage of the symmetrical FIG. 7 arrangement over the unsymmetrical FIG. 8 arrangement is that the fuel assemblies can be inserted into the reactor core without regard for orientation while the assemblies of FIG. 8 must be inserted in the proper manner so as to have the guide rods properly positioned.

The guide rods 46 may be attached to the frames 56 in a number of ways. The frame in FIG. 9 has merely been cut out to provide the proper size gap 70 in the frame and then fusion welded at 72 to the guide rod. FIGS. 10–12 illustrate another manner of attaching the frame to the guide rods. In this procedure a gap 70 is also cut into the frame member 56 in the proper location adjacent the guide rod 46. This forms tabs 74 on the frame 56. Recesses 76 are then cut into the guide rod 46 underlying the tabs 74. These recesses 76 are formed to the depth necessary to provide the proper guide surface protrusion. Holes 78 are then drilled in the guide rod 46 in the recesses between the tabs 74. The holes are then tapped and the threaded pin 80 inserted. The protruding portion of the pin 80 is then fusion welded over the tabs 74 of the frame 56 to form an intimate bond between the pin 80, the frame 56 and the guide rod 46. After fusion welding, the exterior surface of the weld is blended to the contour of the guide rod diameter as shown in FIG. 12. A smooth continuous guide surface is thereby formed.

The guide rods need not be cylindrical as have been illustrated thus far. FIG. 13 shows a guide rod 82 which is somewhat semi-circular in cross sectional configuration with a protruding portion 84. This portion 84 extends through a gap in the frame 56 to form the guide surface 68. The frame 56 is then suitably attached to the rod 82. It is obvious that guide rods of many configurations may be employed. The guide means discussed thus far have been solid rods rather than fuel containing tubes. Since there is normally a neutron flux differential across the width of a fuel assembly, the fuel elements on one side of the assembly are apt to be at a different temperature than the elements on the other side. Since the guide rods which have been illustrated are also serving as structural members to tie the fuel assemblies together, a temperature differential between these tying rods on opposite sides of the assembly would cause a bowing of the fuel assembly as a unit. The solid rods which contain no fuel are, on the other hand, all essentially at the temperature of the reactor coolant. There is no temperature differential which would cause bowing of the fuel assemblies. It is therefore preferable that fuel containing tubes not be used as the guide rods. However, it may in certain instances be permissible or even desirable to use tubes as guide rods. These tubes could either be poison containing tubes or fuel containing tubes in which case they might contain a fuel of a lower enrichment. In the case of the lower fuel enrichment there would not be such a pronounced tendency for temperature differential and thus their use might be permissible. Since there is normally a neutron flux peak adjacent the corners of the fuel assemblies, it might, in certain instances, be advantageous to employ guide rods containing a burnable poison in that area to reduce the neutron flux.

FIG. 14 illustrates the use of a tube 86 as a guide rod. This tube may contain a fuel or a poison. Rather than employ a portion of the tube 86 itself as the guide surface, a bar 88 is attached throughout its length by fusion welding to the exterior surface of the tube 86. The outside surface 68 of the bar 88 thereby serves as the guide surface. The bar 88 standing by itself unattached to tube 86 would not be rigid enough to serve as a guide means. By attaching the bar to the tube 86, however, the guide means is given the necessary effective depth and thereby the necessary rigidity. Frame 56 is attached to the guide means by welding it to the bar 88. The opposite side of tube 86 may also contain a bar corresponding to bar 88 which will serve to balance the temperature of the cladding.

The invention has been illustrated thus far as applied to rectangular fuel assemblies and to cruciform control rods. It is obvious that the principles and advantages of the invention may be utilized with various forms of fuel assemblies. FIG. 15 schematically illustrates the invention as applied to hexagonal fuel assemblies 90 and Y-shaped control rods 92. A symmetrical arrangement of guide rods 94 is illustrated. The invention could as readily be applied to triangular fuel assemblies.

The guide rods not only serve as guides for the control rods but they also protect the fuel elements from damage during the handling of the fuel assemblies. During insertion of the fuel assemblies into the reactor core, it is virtually impossible to keep the assemblies from engaging the previously inserted adjacent assemblies. Absent the guide rods the fuel elements would most certainly rub against at least one of the top support plates 36 thus risking damage and rupture of an element. With the guide rods in position, however, it is the guide rods and not the fuel elements themselves which engage the various portions of the adjacent fuel assemblies. It is therefore evident that the guide rods in the forms proposed by the present invention serve a plurality of functions.

While preferred embodiments of the invention have been shown and described it will be understood that such showings are illustrative rather than restrictive and that changes in construction, combination and arrangement of parts may be made without departing from the spirit and scope of the invention as claimed.

We claim:

1. A core for a nuclear reactor comprising a plurality of longitudinally extending generally parallel fuel elements, said fuel elements being grouped into a plurality of fuel element assemblies and control rods interposed between certain of said fuel element assemblies, said fuel element assemblies adjacent said control rods *each* including *a pair of spaced laterally extending support plates with said fuel elements being supported between said support plates and within the confines of a laterally extending polygon and further including longitudinally extending* guide rods[, said guide rods extending] generally parallel *and of a length coextensive* with said fuel elements, *said guide rods supported between said spaced support plates independently of said fuel elements and arranged in said assembly* with a *first* portion [of said guide rods] *thereof* extending [outwardly from the fuel elements grouped in said assemblies] *outside of said polygon throughout the length of said guide rods* towards said control rods whereby said guide rods will prevent said control rods from engaging said fuel elements *and a second portion thereof extending inside of said polygon throughout the length of said guide rods, said guide rods thereby having a lateral dimension extending from outside said polygon to inside said polygon such that said guide rods are relatively rigid structural members.*

2. A core for a nuclear reactor as recited in claim 1 [wherein the lateral cross section of said fuel element assemblies comprises a polygon] and further including fuel element spacing and support means intermediate the ends of said fuel elements, said spacing and support means being affixed to said guide rods whereby said spacing and support means will be maintained in position.

3. A nuclear fuel element assembly comprising *a pair of spaced laterally extending support plates,* a plurality of longitudinally extending, generally parallel fuel elements *supported between said support plates and at least one longitudinally extending guide rod generally parallel and of a length* coextensive with said fuel elements, said fuel elements arranged in said assembly within the confines of a laterally extending polygon, said guide rod *extending between said spaced support plates and supported independently of said fuel elements and* arranged in said assembly with a *first* portion thereof extending outside of said polygon throughout the length of said guide rod *and a second portion thereof extending inside of said polygon throughout the length of said guide rod, said guide rod thereby having a lateral dimension extending from outside said polygon to inside said polygon such that said guide rod is a relatively rigid structural member* and further including a fuel element spacing and support means intermediate the ends of said fuel elements, said means including a band extending laterally around the outside of said fuel elements and defining said polygon, said band having a portion removed, a portion of said guide rod extending through said removed portion so as to extend beyond the outside of said band.

4. A core for a nuclear reactor comprising a plurality of longitudinally extending fuel element assemblies, said fuel element assemblies spaced apart to provide control rod channels therebetween, said fuel element assemblies each comprising *a pair of spaced laterally extending support plates,* a plurality of longitudinally extending, generally parallel fuel elements *supported between said support plates* and at least one longitudinally extending guide rod generally parallel to and coextensive with said fuel elements *and supported independently of said fuel elements,* said fuel elements arranged in said assemblies within the confines of laterally extending polygons, and said guide rods arranged in said assemblies with a portion of each of said guide rods extending outside of said polygons and into said control rod channels substantially throughout the length of said guide rods thereby providing control rod guide surfaces extending outwardly from said fuel element assemblies *and with another portion of each of said guide rods extending inside of said polygons whereby said guide rods have a lateral dimension extending from outside said polygons to inside said polygons such that said guide rods are relatively rigid structural members.*

5. A core for a nuclear reactor as recited in claim 4 wherein each of said fuel element assemblies includes a plurality of said guide rods with at least one guide rod on each side of said polygon.

6. A nuclear fuel element assembly as recited in claim [5] *9* wherein said band is attached to said guide rod whereby said fuel element spacing and support means will be maintained in position.

7. A core for a nuclear reactor as recited in claim 4 wherein said fuel elements and said guide rods have generally circular cross sections of approximately equal size and wherein said portions extending outside said polygons comprise longitudinally extending bars affixed to said guide rods.

8. A core for a nuclear reactor as recited in claim 4 wherein said fuel elements and said guide rods have generally circular cross sections and wherein the cross sections of said guide rods are larger than the cross sections of said fuel elements and wherein said portions extending outside said polygons comprise longitudinally extending segments of said guide rods.

9. A core for a nuclear reactor as recited in claim 8 and further including fuel element spacing and support means intermediate the ends of said fuel elements, said spacing and support means including bands extending laterally around the outside of said fuel elements and defining said polygons, said bands having portions removed, and said longitudinally extending segments of said guide rods extending through said removed portions so as to extend beyond the outside of said bands.

* * * * *

UNITED STATES PATENT OFFICE

CERTIFICATE OF CORRECTION

Patent No. Re 30,065 Dated August 7, 1979

Inventor(s) Andrew J. Anthony and Edward A. Gruber

It is certified that error appears in the above-identified patent and that said Letters Patent are hereby corrected as shown below:

In Column 10, line 10 change "9" to --3---.

Signed and Sealed this

*Twenty-ninth* Day of *January 1980*

[SEAL]

*Attest:*

SIDNEY A. DIAMOND

*Attesting Officer*

*Commissioner of Patents and Trademarks*